Nov. 26, 1935.  G. A. LYON  2,022,122
TIRE COVER
Filed March 18, 1932  2 Sheets-Sheet 1
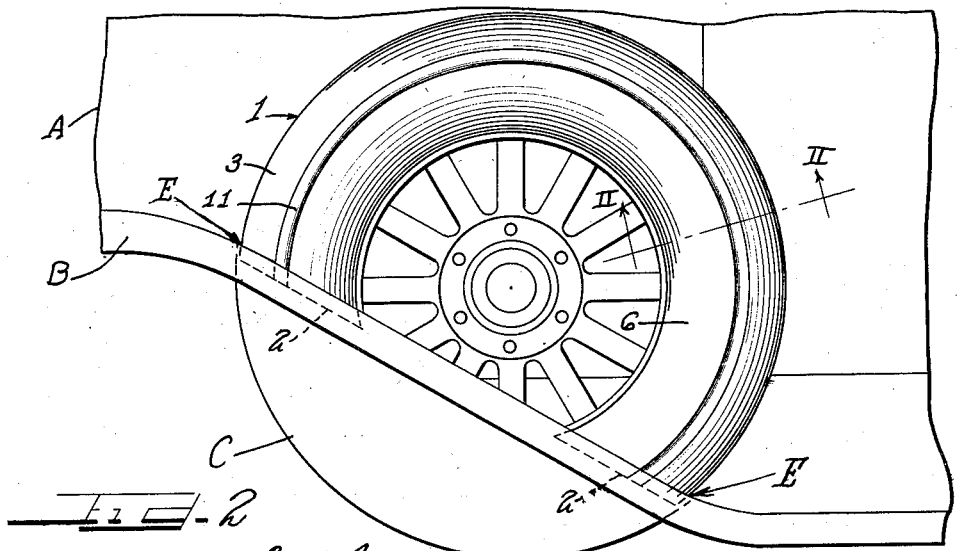
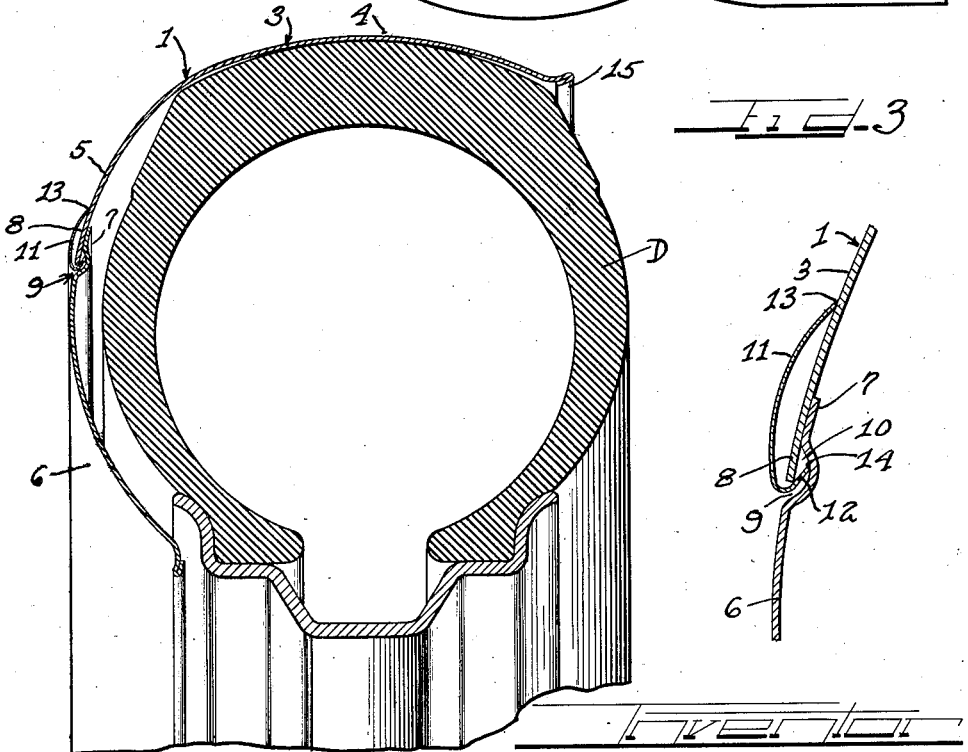
Inventor
George Albert Lyon.

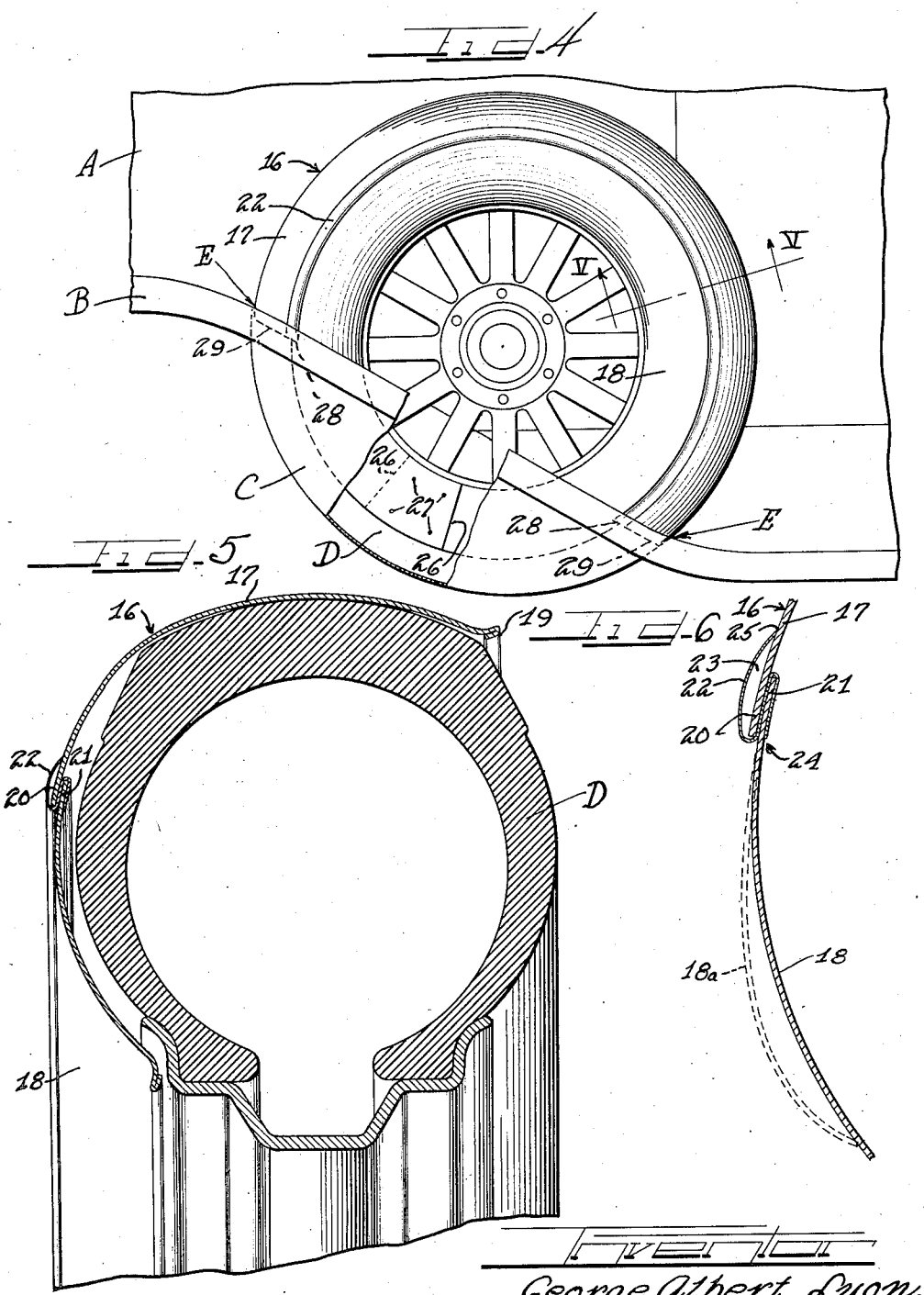

Patented Nov. 26, 1935

2,022,122

UNITED STATES PATENT OFFICE 2,022,122

TIRE COVER

George Albert Lyon, Allenhurst, N. J., assignor to Lyon Incorporated, Asbury Park, N. J., a corporation of Delaware Application March 18, 1932, Serial No. 599,608

19 Claims. (Cl. 150—54)

This invention has to do with covers for spare tires carried in fender wells and elsewhere on a motor vehicle or the like.

It is an object of this invention to provide a shove-on tire cover of this character which may be readily applied to and removed from a spare tire in substantially a single operation or movement of the cover.

It is a further object of this invention to provide a cover of this character which is of unitary construction, including flexible material such as sheet metal which will hold itself by its own resiliency on a tire and yet will permit of its being flexed to allow removal from a tire.

Another object of the invention is to provide a built-up tire cover including molding or beading which cooperates with the parts of the cover in uniting the same.

A further object of the invention resides in an improved method of constructing a built-up unitary tire cover.

Further objects of the invention will appear as the description proceeds.

In accordance with the general features of the invention, the cover comprises an arcuate section shaped to cover the exposed tread portion of a spare tire and preferably also a portion of the side wall of the tire adjacent the tread. The second or side wall covering portion is substantially commensurate with the first section in length and is so dimensioned that when the two sections are concentrically arranged they overlap to conceal the remaining exposed side wall portion of the spare tire, and the overlapping portions of the sections are united in any suitable manner. The overlapping portions are further arranged to provide between them an arcuate recess. A strip of molding substantially commensurate in length with said overlapping portions, of substantially arcuate cross-section with a return bent inner margin, is provided and is formed of resilient material such as sheet metal. The inner marginal edge of the strip of molding is normally so dimensioned that it can be deposited in said arcuate recess only by being snapped thereinto. Thereafter, by reason of the resiliency of the strip of molding, the edges thereof will grippingly or bitingly engage the adjacent surfaces of the sections of the tire cover, so that the cover then is of a unitary character.

If desired, suitable means may be employed for permanently connecting the ends or other portions of the strip to the cover.

In accordance with a further form of the invention, the inner section of the tire cover is originally made in split form and the strip of molding provided with a return bend engaging the inner side of the outer section and providing a recess for receiving the outer marginal portion of the split sections. The split section is resilient and is contracted and snapped into said recess. The overlapping portions of the sections and the adjacent return bent portion of the molding are united in any suitable manner, and the ends of the inner section of the tire cover are also united, thereby providing a unitary cover.

The outer section of the tire cover of either of these forms is of sufficient resilience to allow the same to be flexed in the application and removal of the cover with respect to a spare tire, and these covers may be employed in connection with a spare tire carried in a fender well or elsewhere.

Other features and advantages of this invention will more fully appear from the following detailed description taken in connection with the accompanying drawings, which illustrates two embodiments thereof, and in which Figure 1 is a fragmentary elevational view of an automobile body provided with a fender well for a spare tire and showing a tire cover constructed in accordance with the present invention in tire protecting position.

Figure 2 is an enlarged fragmentary sectional view taken approximately in the plane indicated by the line II—II in Figure 1.

Figure 3 is an enlarged fragmentary sectional view of a detail of the invention.

Figures 4, 5, and 6 are similar respectively to Figures 1, 2, and 3, but show a modified form of the invention.

Referring now more particularly to the drawings, wherein the same parts are designated throughout by the same reference characters, the automobile body A is shown as being provided with a fender B having a well C in which a spare tire D is received. For the purpose of protecting portions of the tire D projecting above the well C, as well as to enhance the appearance of the automobile in connection with which it is used, a tire cover I having a cross-sectional shape conforming to that of the spare tire D and of such circumferential extent that, when in proper tire protecting position, its ends 2 terminate at the mouth E of the well, is provided.

In accordance with the form of the invention appearing in Figures 1, 2, and 3, the tire cover I comprises a transversely and longitudinally arcuate member 3 of sheet metal or similar material capable of being flexed and including a rim portion 4 for covering the tread of the spare tire D and a side portion 5 for covering the portion of the side wall of the tire adjacent the tread thereof.

Also forming a part of the tire cover constructed in accordance with this form of the invention is a side plate 6 for covering the remaining exposed side wall portion of the spare tire D. The side plate 6 is so formed that when placed concentrically with the section 3, portions 7 and 8 respectively of the sections 6 and 3 overlap. The side plate section 6 is provided with a depression 9 adjacent its overlapping outer margin 7, and the inner margin 8 of the section 3 overhangs said depression and provides therewith an arcuate pocket 10 extending substantially throughout the length of the sections 3 and 6.

It will be understood that, if desired, this construction could be reversed by depressing the margin 8 of the section 3 and allowing the margin 7 to project thereover to form a pocket similar to the pocket 10.

While this form of the invention is shown in Figure 1 for use in connection with a spare tire carried in the fender well of the automobile A, it is to be understood that by making use of the principles of the present invention, the cover may be constructed to cover the outer side wall and tread of a tire carried at the rear of a car or elsewhere, so that the entire outer side wall and tread portions are thereby covered.

In the construction of this tire cover, the sections 3 and 6 are placed in substantially concentric relation with the margins 7 and 8 overlapping as shown, whereupon suitable means such as rivets or welding is employed for uniting the sections.

For the purpose of improving the appearance of the tire cover and the automobile in connection with which the same is used, as well as to conceal the projecting margin 8, there is provided a strip 11 of a length substantially commensurate with the sections 3 and 6 and of generally arcuate cross-section. The strip of molding 11 includes a return bent inner margin or anchor 12 whose free edge is of a normal diameter greater than that of the free edge of the margin 8 of the section 3, so that the margin 12 may be snapped or otherwise positioned in the pocket 10, and the resilience of the strip 11 will serve to hold the same therein as shown, the free edges 13 and 14 of the strip 11 preferably bitingly or grippingly engaging the adjacent portions. The pressure exerted by the strip 11 in tending to restore the same to its normal condition may suffice to hold the strip in the position shown, although if desired the ends or other parts of the strip 11 may be secured to the ends 2 of the tire cover 1 in any suitable manner.

The rim portion 4 of section 3 has its marginal portion 15 return bent to avoid a sharp edge and is flared to facilitate by a cam action the application of the cover to a spare tire. The material of which the rim portion 4 is made is sufficiently resilient to allow the marginal portion 15 to yield to an extent necessary to assure ease of application and removal of the cover with respect to a tire, yet capable of maintaining the cover on the tire against rattling and accidental dislocation or removal.

It will be seen from the foregoing, that a tire cover constructed in accordance with this form of the invention may be made very economically and quickly, since a minimum of parts and operations is required to construct the same.

In accordance with the form of the invention appearing in Figures 4, 5, and 6, the tire cover 16 comprises sections 17 and 18 covering respectively the exposed tread and adjacent portion of a side wall of the spare tire D and the remaining portion of said side wall. The rim portion 17 has its outer margin 19 return bent to avoid a sharp edge and flared to facilitate by a cam action the ready application and removal of the cover with respect to a spare tire. The section 17 is so dimensioned that its normal outer diameter is sufficiently less than that of the spare tire to grip the tread thereof when disposed thereon with sufficient pressure to prevent rattling and accidental removal from the tire.

The side plate 18 is made in the form of a split ring and is resilient to permit itself to be compressed into a smaller diameter and to exert an outward pressure when thus compressed.

The sections 17 and 18 are so dimensioned that when they are arranged in concentic relation, the adjacent marginal portions 20 and 21 overlap as shown.

For the purpose of enhancing the appearance of the tire cover and the automobile in connection with which the same is used, molding 22 in the form of a substantially transversely S-shaped longitudinally arcuate strip of material such as sheet metal of a length substantially commensurate with that of the section 17 is provided. The arcuate recesses 23 and 24 in the S-shaped strip 22 are formed to receive the overlapping portions 20 and 21 of the sections 17 and 18, the recess 24 receiving the portion 21 with preferably a tight fit. The overlapping margins 20 and 21 of the sections 17 and 18, respectively, together with the walls of the recess 24 of the strip 22, are united by riveting, welding or other suitable instrumentalities, the remainder of the strip 22 concealing the free edge of the margin 20 of the fixed section 17, extending outwardly and bitingly or grippingly engaging the section 17 at the free edge of the strip 22 at 25. To insure the proper contact at 25, the strip 22 is preferably formed to have a normal diameter somewhat greater than that when assembled with the sections 17 and 18. The section 18 may be compressed in any suitable way, in order that the same may be positioned so that its outer marginal portion 21 will enter the recess 24 of the strip 22, and is preferably initially flexed to assume the shape indicated at 18a in dotted lines in Figure 6.

Once the parts are assembled as described, the overlapped ends of the section 18 are united by rivets or welding 27 and the ends 28 of the strip 22 are suitably closed if desired, whereupon the formation of the tire cover in accordance with this form of the invention is completed. It will be noted that this form of the invention is constructed with the same economy and ease and simplicity as characterized the form of the invention shown in Figures 1, 2, and 3.

With this construction, the connected ends 26 of the side plate section 18, when in use, are concealed from view by the fender well C. Moreover, this cover may be applied to a tire carried in the fender well notwithstanding the fact that the section 18 is continuous since the margin 19 of the section 17 adjacent the ends 29 thereof may be flexed outwardly to permit the ends 29 to be moved in the plane of the tire past the diametrically opposed portions of the tread to the positions shown in Figure 4 at the mouth E of the well C, while the projecting intermediate portion of the side plate 18 is deposited into the well C in the position shown in Figure 4. When the pressure on these portions of the margin 19 is released, the tread covering portion 17 grips the tread as above described.

If desired, instead of making the side section 18 continuous as described hereinabove, the same may be made of a length commensurate with that of the rim section 17 and molding strip 22.

The procedure described in the next to the last paragraph may be employed in applying this form of tire cover to a spare tire not carried in a fender well or the like, as at the rear of an automobile, or the cover may be applied laterally by shoving the same against the tire, the flared margin 19 being cammed outwardly to allow the cover to be placed in proper tire protecting position.

While the parts 17, 18, and 22 of the tire cover 16 may be assembled in any suitable manner, the strip 22 is preferably first applied to the margin 20 of the section 17 as shown, and the section 18 thereafter compressed to allow its outer margin 21 to be deposited in the recess 24 of the strip 22 with a tight fit, after which the parts are united as described above.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A built-up tire cover comprising sheet metal tread and side wall covering sections, the inner marginal portion of the tread covering section and the outer marginal portion of the side wall covering section being interconnected, the side wall covering section having an arcuate depression adjacent and overhung by said margin of the tread covering section, thereby providing an arcuate pocket, and a strip of molding having one edge in contact with the outer surface of the tread covering section and its other edge return bent and disposed in said pocket.

2. A multi-part unitary tire cover comprising interconnected rim and side sections for covering respectively the exposed tread and a side wall of a spare tire, said sections having overlapping portions providing an arcuate space therebetween, and a strip of molding substantially commensurate in length with said space and provided with an anchor portion received in said space.

3. A multi-part unitary tire cover comprising interconnected rim and side sections for covering respectively the exposed tread and a side wall of a spare tire, said sections having overlapping portions providing an arcuate space therebetween, and a strip of molding substantially commensurate in length with said space and provided with an anchor portion received in said space, said strip being made of resilient material and having a normal diameter other than that when connected to said cover, whereby said strip is held in position by its own resilience.

4. A multi-part unitary tire cover comprising interconnected rim and side sections for covering respectively the exposed tread and a side wall of a spare tire, said sections having overlapping portions providing an arcuate space therebetween, and a strip of molding substantially commensurate in length with said space and provided with an anchor portion received in said space, said strip being made of resilient material and having a normal diameter in excess of that when connected to said cover, whereby said anchor portion is constantly urged into said space to thereby hold the strip in place.

5. A built-up tire cover comprising tread and side wall covering sections having interconnected marginal portions, one of said portions having a substantially arcuate depression and the other marginal portion partly overhanging said depression to provide a pocket, and a strip of molding having an anchor portion disposed in said pocket, said strip being under tension whereby said anchor portion is constantly urged toward the deeper part of the pocket.

6. A built-up tire cover comprising tread and side wall covering sections having interconnected marginal portions, one of said portions having a substantially arcuate depression and the other marginal portion partly overhanging said depression to provide a pocket, and a strip of molding having an anchor portion disposed in said pocket, said strip being under tension whereby said anchor portion is constantly urged toward the deeper part of the pocket, the edge of said strip opposite said anchor portion being in firm engagement with the outer surface of one of said sections.

7. A built-up tire cover comprising tread and side wall covering sections having interconnected marginal portions, one of said portions having a substantially arcuate depression and the other marginal portion partly overhanging said depression to provide a pocket, and a strip of molding concealing said overhanging margin and having an anchor portion disposed in said pocket, said strip being under tension whereby said anchor portion is constantly urged toward the deeper part of the pocket.

8. A built-up tire cover comprising tread and side wall covering sections having interconnected marginal portions, one of said portions having a substantially arcuate depression and the other marginal portion partly overhanging said depression to provide a pocket, and a strip of molding concealing said overhanging margin and having an anchor portion disposed in said pocket, said strip being under tension whereby said anchor portion is constantly urged toward the deeper part of the pocket, said sections, adjacent their marginal portions, forming transversely substantially continuations of each other, whereby said sections have the appearance of being made integral.

9. A built-up tire cover comprising tread and side wall covering sections having overlapped margins, a substantially S-shaped connecting element receiving said margins, and means for uniting said sections and element, the outer edge of said element being in firm engagement with the outer surface of one of said sections, said element adjacent said edge being spaced from said surface to provide the element with a transversely curved bead-like appearance.

10. A tire cover of the class described comprising tread and side wall covering sections having their margins arranged to overlap when said sections are concentrically disposed, means associated with one of said sections and providing a pocket for receiving the margin of the other section, said other section being discontinuous and of resilient material whereby the same may be flexed to a diameter sufficient to permit the margin thereof to enter said pocket and upon release of said pressure to tend to assume its original condition and thus spring the margin in said pocket.

11. A tire cover of the class described comprising tread and side wall covering sections having their margins arranged to overlap when said sections are concentrically disposed, means associated with one of said sections and providing a pocket for receiving the margin of the other section, said other section being discontinuous and of resilient material whereby the same may be flexed to a diameter sufficient to permit the margin thereof to enter said pocket and upon release of said pressure to tend to assume its original condition and thus spring the margin in said pocket, and means for uniting said margins.

12. A tire cover of the class described comprising tread and side wall covering sections having their margins arranged to overlap when said sections are concentrically disposed, means associated with one of said sections and providing a pocket for receiving the margin of the other section, said other section being discontinuous and of resilient material whereby the same may be flexed to a diameter sufficient to permit the margin thereof to enter said pocket and upon release of said pressure to tend to assume its original condition and thus spring the margin in said pocket, said one section having a longitudinal extent in excess of 180°.

13. A tire cover of the class described comprising tread and side wall covering sections having their margins arranged to overlap when said sections are concentrically disposed, means associated with one of said sections and providing a pocket for receiving the margin of the other section, said other section being discontinuous and of resilient material whereby the same may be flexed to a diameter sufficient to permit the margin thereof to enter said pocket and upon release of said pressure to tend to assume its original condition and thus deposit the margin in said pocket, and means for uniting the ends of the other section.

14. A tire cover of the class described comprising tread and side walls covering sections having their margins arranged to overlap when said sections are concentrically disposed, means associated with one of said sections and providing a pocket for receiving the margin of the other section, said other section being discontinuous and of resilient material whereby the same may be flexed to a diameter sufficient to permit the margin thereof to enter said pocket and upon release of said pressure to tend to assume its original condition and thus deposit the margin in said pocket, and means for uniting the ends of the other section, said first mentioned means concealing the margin of, and having its outer edge in contact with, said one section.

15. A multi-part unitary tire cover comprising rim and side sections for covering respectively the exposed tread and a side wall of a spare tire, said sections having overlapping interconnected portions providing an arcuate recess, and a strip of molding substantially commensurate in length with said recess and provided with an anchor portion received in said recess, said recess comprising an annular space between said overlapped portions and which space is transversely curved, said anchor portion comprising a turned under part of the strip of molding and being curved to fit in said space.

16. A multi-part unitary tire cover comprising rim and side sections for covering respectively the exposed tread and a side wall of a spare tire, said sections having overlapping interconnected portions providing an arcuate recess, and a strip of molding substantially commensurate in length with said recess and provided with an anchor portion received in said recess, said molding strip being or transverse convex curvature and having an exposed edge biting into the outer surface of said side section.

17. A tire cover comprising a substantially arcuate member for covering a portion of a spare tire, anchoring means forming with said member a substantially arcuate recess, and a flexible bead contracted into telescoped relation with said means, one side edge of said bead engaging in said recess and being the only edge connected to said member.

18. A tire cover comprising a ring-like plate for covering a side wall of a spare tire, ring-like means forming with said plate an arcuate groove, a bead telescoped over said means and having a portion disposed in said groove, said bead being expansible and contractible and said portion engaging said means under tension, one side of said bead engaging in said recess and being the only edge connected to said member.

19. A tire cover comprising a substantially arcuate member for covering a portion of a spare tire, anchoring means forming with said member a substantially arcuate recess, a flexible bead contracted into telescoped relation with said means, one side edge of said bead being engaged in said recess and being the only edge in telescoping relation with the anchoring means, and means independent of the anchor means for fastening the bead to the member.

GEORGE ALBERT LYON.